United States Patent [19]

Sievers et al.

[11] 3,891,363
[45] June 24, 1975

[54] MOLD SEGMENT FOR VULCANIZING MOLDS

[75] Inventors: Willi Sievers, Korbach; Andre Van Steenput, Arolsen, both of Germany

[73] Assignee: Continental Gummi-Werke Aktiengesellschaft, Hannover, Germany

[22] Filed: Aug. 22, 1974

[21] Appl. No.: 499,531

[30] Foreign Application Priority Data
Aug. 23, 1973 Germany............................ 2342614

[52] U.S. Cl.................. 425/28 R; 425/812; 249/141
[51] Int. Cl. .............................................. B29r 1/00
[58] Field of Search............ 425/812, 28 R; 249/141

[56] References Cited
UNITED STATES PATENTS
| | | | |
|---|---|---|---|
| 1,019,506 | 3/1912 | McCool | 425/812 |
| 1,746,107 | 2/1930 | Mattia | 425/812 |
| 2,756,460 | 7/1956 | Heintz | 425/812 |
| 3,377,662 | 4/1968 | Fukushima | 425/812 |
| 3,804,566 | 4/1974 | Kimura et al. | 425/812 X |

FOREIGN PATENTS OR APPLICATIONS
| | | | |
|---|---|---|---|
| 1,016,124 | 1/1966 | United Kingdom | 425/812 |
| 4,520,375 | 1970 | Japan | 425/812 |
| 455,897 | 1970 | Japan | 425/812 |

*Primary Examiner*—J. Howard Flint, Jr.
*Attorney, Agent, or Firm*—Walter Becker

[57] ABSTRACT

A mold segment for a vulcanizing mold comprising a plurality of radially movable segments, which comprises venting bores extending from the inside of the segment to the outside thereof while tubular inserts of fluor-carbon material are respectively inserted in the venting bores and extend from the inside of the segment over a portion of the length of the venting bores, the rest of the length of the venting bores preferably being filled by retaining sleeves for preventing the tubular inserts from moving to the outside of the segment.

7 Claims, 2 Drawing Figures

3,891,363

MOLD SEGMENT FOR VULCANIZING MOLDS

The present invention relates to a vulcanizing mold, especially a vulcanizing mold composed of a plurality of radially movable segments, for pneumatic vehicle tires, which mold is provided with open venting bores leading from the mold chamber through the mold walls.

The effective venting of vulcanizing molds causes considerable difficulties in connection with the manufacture of rubber articles. This is particularly true with regard to the finish vulcanization of pneumatic vehicle tires because those parts of the mold wall which only in closed condition of the mold form the profiled tread surface of the tires and which are provided with block or lamallae-like protrustions and deep crevices and undercuts from the very start create rather difficult conditions for the total venting of the air from all regions of the hollow mold chamber. In order to avoid faulty products as the result of air enclosures, it is, therefore, necessary to provide a great number of venting bores, above all in those mold sections which are particularly subjected to entrapping air. By means of such bores which directly lead from the hollow mold chamber into the free atmosphere, a practically complete venting of the mold can be obtained provided that said bores are properly arranged. On the other hand, however, also plastic rubber mixture flows into said bores and partially forms a thorn-like flash which protrudes from the finished articles. This flash has to be mechanically removed by additional operations while on the other hand the plastic rubber mixture in said bores will after completed vulcanization tear off when opening the mold and will clog up the venting bores, thereby making the same ineffective. The heretofore made suggestion to seal the bores by the insertion of a porous material such as sinter metal while maintaining the air permeability and preventing the entry of rubber mixture, has not proved satisfactory in practice because these inserts clogged up after a few working cycles and then were no longer effective for the venting of air.

It is, therefore, an object of the present invention to prevent the flash from the vulcanizing molds through venting bores, without impeding the venting, or at least to reduce the flash so that it will occur only to a negligible extent. This object and other objects and advantages of the invention will appear more clearly from the following specification in connection with the accompanying drawing, in which.

Figure 1:
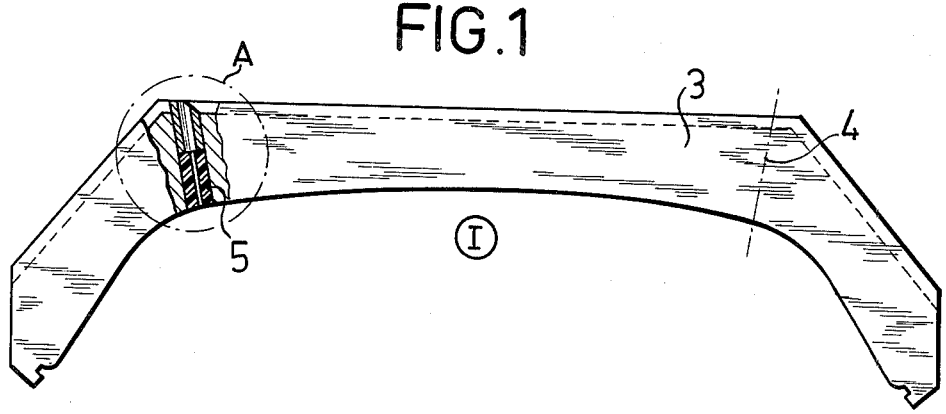
FIG. 1 illustrates a portion of a tire vulcanizing mold with a venting bore according to the present invention.
Figure 2:
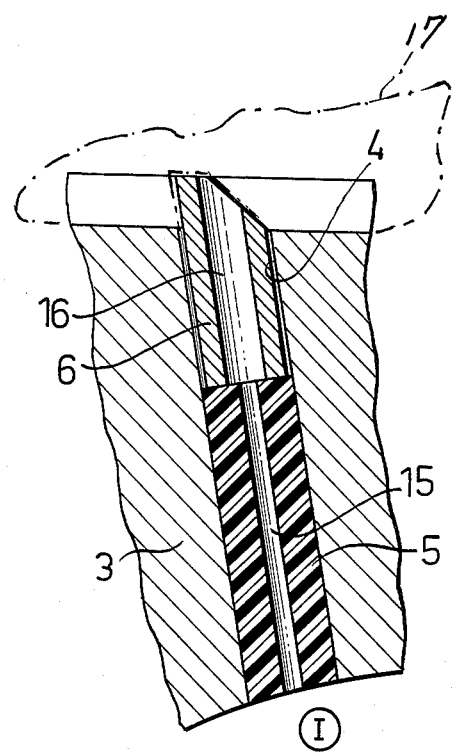
FIG. 2 illustrates on a considerably larger scale than FIG. 1 that portion of FIG. 1 which is encircled by a dot-dash line.

The vulcanizing mold according to the present invention which is provided with open venting bores leading from the interior chamber of the mold through the mold walls into the atmosphere is characterized primarily in that the venting bores are over at least a portion of their length from their mouth leading into the hollow mold chamber lined with inserts of a fluor-carbon material for instance polytetrafluoroethylene material which covers the inner mantle surface of said venting bores.

Advantageously, these inserts which frictionally engage the bore walls are provided with bores extending in axial direction and having a small fraction of the insert cross section of a corresponding free cross sectional surface. For the intended effect it has proved sufficient to dimension the inserts considerably shorter than the length of the venting bores and to prevent said inserts from moving outwardly by sleeve bodies of a metallic material. These sleeve bodies are inserted from that mouth of the bore which is open to the atmosphere and have a considerably greater passage cross section than the bores in the inserts.

Referring now to the drawing in detail, the mold part 3 illustrated therein is indicated by contour lines of one of the radially movable segments of a multi-sectional tire vulcanizing mold, while that side of the mold designated with I faces the inner hollow chamber of the mold. In the shoulder region on both sides of the tread strip of the tires to be vulcanized, venting bores 4 are provided which are distributed over the entire circumference of the annular mold and in spaced relationship to each other through which when closing the mold and pressing in the raw tire into the tread surface profiles of the mold segments 3, the entrapped air is discharged into the atmosphere.

Inserts 5 of a polytetrafluorethylene material, for instance of the material known under the trademark Teflon, are inserted into the cylindrical venting bores 4 which inserts are cylindrical and provided with an axial bore 15. These inserts are inserted into the bores 4 to such an extent that their inner end faces adjacent the hollow chamber 1 are flush with the inner circumferential surface of the mold segments 3. The diameter of the bore 15 is only a fraction of the diameter of the venting bore 4 in order to keep the quantity of rubber material which might enter from the tread surface as small as possible. The insert 5 extends from the mouth of the venting bore 4 over approximately half the wall thickness of the segment 3 and is prevented from undesired axial displacements by a sleeve or bushing 6 of steel or other material which sleeve or bushing 6 is inserted from the outside into the venting bore. The bushing 6 has a relatively wide axial bore 16 and is fixed in its position by portions 17 indicated diagrammatically only by dot-dash lines and pertaining to the mold closing mechanism.

The employment of the inserts according to the invention in the venting bores bring about a surprising improvement. The relatively fine bores in the inserts permit an undisturbed air discharge from the mold chamber, while relative thereto the flash which may still form will be negligible in view of their minute dimensions so that no necessity for deburring the finished article exists. Experience has shown, the inserts will never fully clog up even when rubber mixture partially deposits therein so that the efficiency of said inserts for the venting will not be materially affected thereby. Decisive for this favorable action is the manufacture of said inserts of a fluor-carbon. It is assumed that this is due to the known anti-adhesive properties and the low slide friction of the fluor-carbons. The mostly cylindrical mantle surface of the inserts permit neither at the outer surface relative to the material of the mold walls nor inside the bores of said inserts an adherence of rubber material, and also residues of the solvents used for brushing the mold inner walls or other molten particles cannot deposit or accumulate. Even after occasional jamming of rubber particles, on the smooth shiny insert walls there will be left a sufficient gap for the air passage. The surface quality, however, is not the only decisive factor. A greater roll is probably played by the complete saturation of all valancies within this particular material so that consequently no residual valancies remain on the mantle surfaces of the inserts which residual valancies aid the adherence or deposit of foreign materials.

It is, of course, to be understood that the present invention is, by no means, limited to the specific showing in the drawing, but also comprises any modification within the scope of the appended claims.

What we claim is:

1. A mold segment for a vulcanizing mold comprising a plurality of radially movable segments, which comprises venting bores extending from the inside of said segment through said segment to the outside thereof, and tubular insert means of a fluor carbon inserted into said venting bores and extending from the inside of said segment along at least a portion of the length of said venting bores.

2. A mold segment according to claim 1, in which said tubular insert means is of polytetrafluoroethylene.

3. A mold according to claim 1, in which said tubular insert means have an axial bore of a considerably shorter diameter than that of said venting bores.

4. A mold according to claim 1, in which said insert means engage the wall of said venting bores with a wide fit.

5. A mold according to claim 1, in which said tubular insert means extend only over a shorter length than the total length of said venting bores, and which includes sleeve members respectively inserted into said venting bores while extending from the outside of said segment to the respective adjacent end of said tubular insert means for preventing the latter from moving to the outside of said mold segment.

6. A mold according to claim 5, in which said sleeve members have an axial bore of a considerably greater diameter than that of the bores of said tubular insert means.

7. A mold according to claim 5, in which said sleeve members are metallic.

* * * * *